Nov. 28, 1933.   B. H. BROWALL   1,936,977
VARIABLE LEVERAGE MECHANISM
Filed March 21, 1932   3 Sheets-Sheet 1

B. H. Browall
INVENTOR

By Marks & Clerk
Attys.

Nov. 28, 1933.   B. H. BROWALL   1,936,977
VARIABLE LEVERAGE MECHANISM
Filed March 21, 1932   3 Sheets-Sheet 2

B. H. Browall
INVENTOR

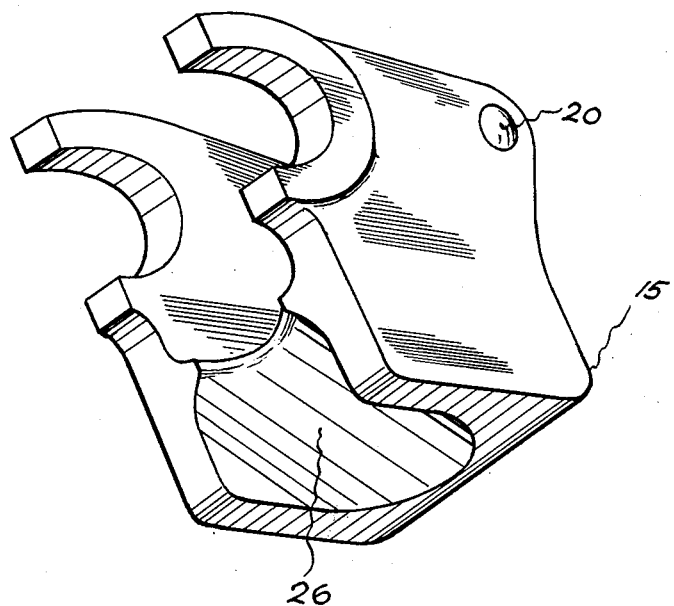

Patented Nov. 28, 1933

1,936,977

UNITED STATES PATENT OFFICE 1,936,977

VARIABLE LEVERAGE MECHANISM

Bert Henry Browall, Malmo, Sweden, assignor to Svenska Aktiebolaget Bromsregulator, Malmo, Sweden, a corporation of Sweden Application March 21, 1932, Serial No. 600,343, and in Germany March 23, 1931

12 Claims. (Cl. 188—195)

My present invention refers to improvements in or relating to empty-load switches for changing the ratio of leverage in brake riggings of vehicles, especially railway vehicles. More particularly the invention relates to empty-load switches of the kind in which the switching movement is transmitted by the intermediary of spring action to the switch members (abutments or the like) defining the ratio of leverage in the brake rigging.

The main object of the invention is to provide a spring arrangement limiting the possibilities of adjustment to two distinct end positions for the switching movement and positively retaining the switch members in the said positions by spring action so as to prevent the said members from being invountarily reversed for instance due to jolting of the vehicle when running. Simultaneously the advantage may be obtained that it will not be necessary to lock the hand lever, crank or another manually operated actuating member or members in position after completing the switching movement but, on the contrary, the said actuating member or members may be positively retained in position by means of the same spring maintaining the empty-load switch members in position. Simultaneously with obtaining by the said means a considerable simplification of the mechanism the additional advantage is gained that there will be no locking device for the actuating members to unlock before a switching movement can be performed, and that the manually operated actuating member may be moved from one end position to the other also for instance when the brake is applied. Hereby the operation will be essentially facilitated.

Generally, the invention is based upon the employment of a setting spring as a positively operating reversing member, the said spring being mounted between crank-pins in such a manner as to force it over the centre in one direction or the other. Besides, the invention includes also certain arrangements for the purpose of decreasing to a minimum the reversing angle of an empty-load switch member connected with one of the cranks between which the tensional spring is mounted as described in the following.

An embodiment of the invention is about to be described in detail in the following with reference to the accompanying drawings in which Fig. 1 shows a plan view of the brake cylinder and its levers and pullrods on a reduced scale as compared with the other figures, Fig. 2 shows a vertical section of the empty-load switch device proper.

Figure 1:
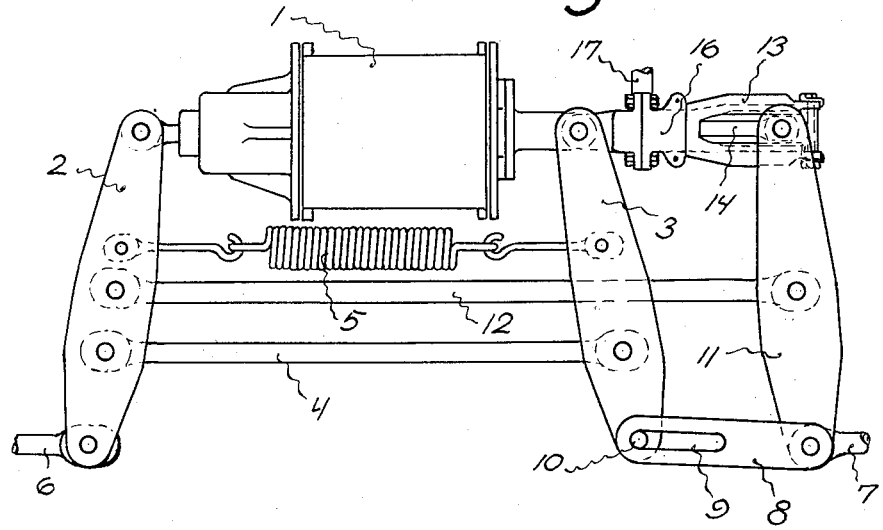

The embodiment of the invention shown in the drawings relates to mechanical empty-load switches provided with a gradually variable ratio of leverage and two brake levers or balances having an invariable but mutually different ratio of leverage and capable of being engaged in operative position in the brake rigging. However, the invention is not limited to employment exclusively in such connection but may be employed in a similar manner in brake riggings, the different ratio of leverage of which is effected by displacement of the fulcrum of a single lever. Thus the invention generally comprises switching the fulcrum from operative position into inoperative position, or vice versa, whether the said switching is effected in connection with a lever having another fulcrum or not.

Even though the invention is described in the following and illustrated in the drawings as applied to the levers forming part of the brake rigging and being associated with the brake cylinder, the said application is not obligatory, and the invention is applicable in the same degree wherever the levers may be mounted in the rigging, i. e. also in the case that they form intermediary levers between the levers of the brake cylinder and the shoes.

With reference to Fig. 1 of the drawings, 1 is the brake cylinder, 2 is the live lever, 3 is the dead lever, 4 is a pull rod connected between the said levers, and 5 is the release spring. The levers 2 and 3 are connected in the usual manner to pull rods 6 and 7, respectively, forming part of the brake rigging and having for its object to transmit the brake power to the shoes but in the present case the dead lever 3 is not directly connected to the pull rod 7, the connection being obtained by the intermediary of a link 8 provided with a slot 9 embracing a pin 10 connected to the lever. Besides, the rigging includes a third lever 11 connected to the live lever 2 by means of a second intermediary pull rod 12, and it is evident from the drawings that the levers 2 and 3 are coupled by the intermediary pull rod 4 at another ratio of leverage than are the levers 2 and 11 by the intermediary pull rod 12, and this fact makes also immediately evident that the two levers 3 and 11 can not be in operation at the same time. The said levers are also intended to be employed alternately when braking at the different ratios of leverage, and for this purpose the slot 9 is provided. The end of the lever 11 remote to the pull rod 7 is simultaneously slidably guided in a fixed guide 13 and connected to a push rod 14 coacting with an abutment 15 (Figs. 2 and 3) which is arranged in such a manner as to be brought into or out of the path of movement of the free end of the push rod 14, as desired, according as the lever 11 is to be put in operation or out of operation. When braking with the lever 3 the abutment 15 is out of the path of movement of the rod 14, the lever 11 thereby being deprived of its fulcrum or support and unable to take part in the power transmission to the shoes, the said lever moving idly while the rod 14 slides freely in its guide. When braking with the lever 11, the abutment 15 is positioned in the path of movement of the rod 14 and thus forms a support or fulcrum for the said rod and lever so as to transmit the power through the said lever, the lever 3 simultaneously operating in lost motion, the pin 10 sliding in the slot 9.

In respect of the parts thus described, the device is considered to be previously known, and it is evident that if the lever 11 has taken part in the power transmission and the brake is applied, the rod 14 rests so firmly against the abutment 15 that the latter can not be reversed without first releasing the brake. If on the other hand the lever 3 has taken part in the power transmission, the rod has during the braking operation been displaced so far beyond the abutment as to prevent the latter from being entered into the path of movement of the rod. The device according to the invention will function in such a manner that after a reversing impulse, for instance the reversal of an actuating lever, a corresponding reversal of the abutment is automatically effected as soon as the brake is released, as will be evident from the following.

Figure 3:
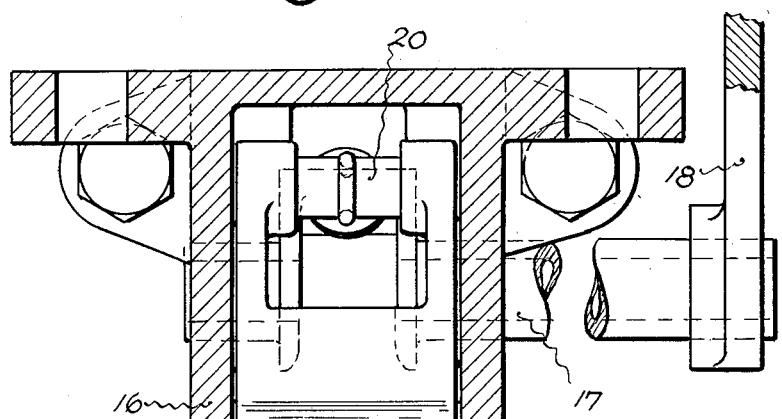
Fig. 3 shows another vertical section of the empty-load switch device proper, this section being taken at a right angle to Fig. 2.
Figure 2:
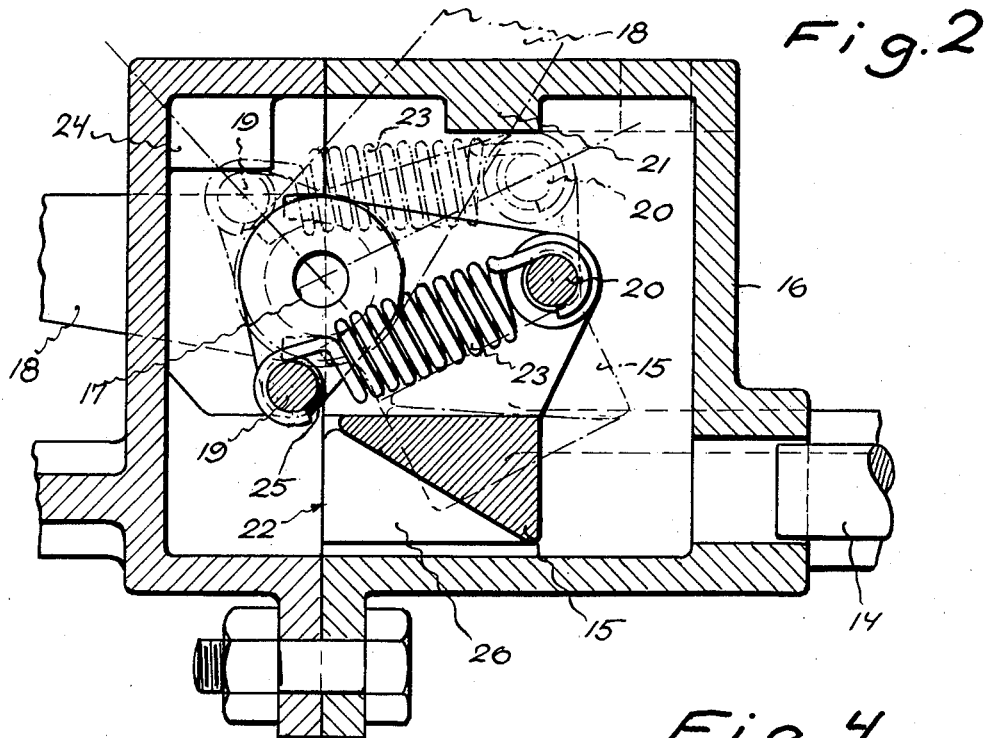
Figure 4:
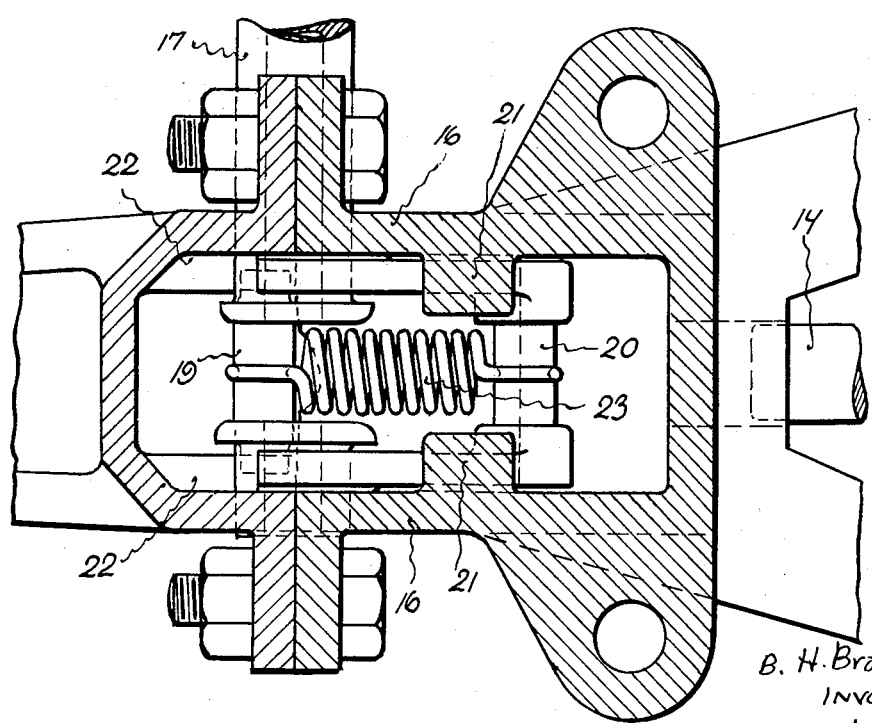
Fig. 4 shows a horizontal section through the device.

According to Figs. 2 to 4 inclusive, the abutment 15 is rotatably mounted in a housing 16 about a shaft 17 connected to a suitable actuating member for instance a hand lever 18, as indicated in the drawings. The shaft may extend all through the housing 16 and be connected, at both ends, to hand levers positioned at opposite sides of the car so as to permit of reversing being effected from either side of the car. Within the housing 16 the shaft 17 is in the form of a crank which is thus fixedly connected to the remaining portion of the shaft, and around the said shaft another crank 20 is freely rotatably mounted at the opposite side of the shaft, the said crank being integral with the abutment 15 which is substantially in the form of a block. Thus the abutment block 15 is rotatable together with the crank 20 about the shaft 17 and its rotary movement is limited in one direction (counter-clockwise in Fig. 2) by abutments 21 fixedly provided in the housing 16, the crank 20 engaging the said abutments, while rotation in the opposite direction is limited by other abutments 22 likewise fixedly provided in the housing and forming supports for the abutment block 15 in operative position. Between the cranks 19 and 20 a relatively strong tensional spring 23 is mounted, and the movement of the crank 19 is also limited by abutments 24 and 25 fixedly positioned within the housing 16 and the last mentioned one of the said abutments may be integral with the parts constituting the abutments 22. All the abutments are suitably made in the form of interior projections within the housing 16, and from Fig. 2 it is evident that they are positioned so as to allow the crank 19 and thus also the shaft 17 and actuating lever 18 to be moved through an angle of about 120°, while the rotary movement of the crank 20 and, consequently, also the abutment block 15 is limited to approximately 30° whereas the end positions of the cranks are symmetrical in relation to a common straight line through the axis of rotation of the cranks. The difference in the angles of rotation of the two cranks is so great, that if the crank 19 is rotated over the centre in one direction or the other, the spring 23 will pass the centre in the same direction, thereby pulling the crank 20 over to the same side and afterwards maintaining both cranks in this position. If for instance the crank 19 is rotated against the abutment 25, the spring 23 will pass downwards below the centre (as viewed in Fig. 2), pulling the crank 20 downwards, too, and tending to switch the abutment block 15 over to rest against the abutments 22. Supposing the rotation of the crank 19 be effected with the brake in applied position (operating over lever 3), the only difference is that the rod 14, having then been pushed in by the lost motion of lever 11, will momentarily prevent the switching over of the abutment block 15. As soon as the brake is released, however, the rod 14 is withdrawn into its original position, and the abutment block 15 is automatically switched over by the spring 23 into the position corresponding to the reversal of the actuating lever and the crank 19. The functioning will be exactly alike when the crank 19 is reversed towards the abutment 24 and the brake is in applied position (operating over lever 11): the rod 14 then rests firmly against the abutment block 15 and prevents the switching over of the same, but as soon as the brake is released and the rod 14 withdrawn, the switching over takes place (upwards—compare the position shown in dotted lines in Fig. 2). Thus, it is not necessary to wait for the brake to be released in order to be able to effect the reversal of the actuating lever and the crank 19. From the above it is also evident that no special locking devices are necessary for the purpose of retaining the actuating lever 18 in the end positions, since the spring 23 will act upon the actuating lever in exactly the same manner as upon the abutment block 15.

Figure 5:
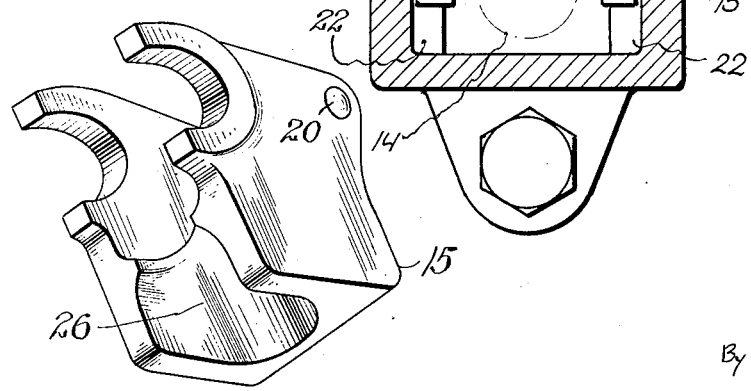
Fig. 5 is a perspective view of the abutment block.

In order to enable the manner of action above described to be carried out, the crank 19 must have a considerably much larger angle of rotation than the crank 20 for the purpose of ensuring the function even if the rod 14 happens to be in its pushed in position within the housing 16, but it is evident that the angle of movement of the crank 19 can not be selected at will, since the spring would then be substantially tension-less in the end positions. Accordingly, it is important that the angle of rotation of the abutment block 15 and crank 20 be as small as possible, this also encountering with difficulties, however, as it is unavoidable that the movement of the block be large enough to permit the said block to be rotated entirely into and out of the path of movement of the rod 14, the said rod also requiring, with a view to strength, a certain minimum dimension. In order to overcome the said difficulties the abutment block 15 is provided at its outer side facing away from the shaft 17, with an inclined, preferably semicylindrical recess 26 (see particularly Fig. 5). The said recess (see Fig. 2) is inclined in such a manner as to position its inner generatrix or bottom, when the abutment block is in its upper position shown in dotted lines, approximately parallel to the path of movement of the rod 14 and when the block is in its upper position, the rod may pass freely through the recess. For the same purpose the abutments 22 are positioned behind opposite side edges of the abutment block.

The operation of the device described is as follows:

When it is desired to brake by power transmission by means of the lever 11, the abutment block 15 is reversed into the position shown in full lines in Fig. 2, and then, by the intermediary of the rod 14, the block will form a support or fulcrum to the said lever. In the drawings the approximate position of the rod 14 is shown when the brake is released, and it is evident from the said drawings that there is a space between the end of the rod and the abutment block. The said space corresponds to the portion of the stroke of the brake piston required for the purpose of advancing the brake shoes to the wheels (the advancing stroke). When it is desired to brake by power transmission by means of the lever 3 and the abutment block 15 is, accordingly, withdrawn from the path of movement of the rod 14 the end of the rod will have to be passed somewhat beyond the block, and this is made possible by the arrangements referred to above.

Instead of the tensional spring a pressure spring may be employed, the cranks then being positioned at the same side of the axis of the shaft.

Finally, it will be set forth that it is not absolutely necessary that the cranks 19 and 20 be arranged in such a manner as to make them rotate about a common axis but exactly the same manner of action of the device may be obtained if each crank has its own axis of rotation. In this case a straight line through the two axes of rotation will be employed as a common line of symmetry for the end positions of the two cranks.

What I claim and desire to secure by Letters Patent is:—

1. In a brake device for vehicles, especially railway vehicles, of the type comprising a source of brake power, brake shoes and a brake rigging interconnecting the said source of brake power and the brake shoes for acting upon the wheels of the vehicle, a mechanical empty-load switch comprising in combination an abutment block adapted to form a removable fulcrum for a brake lever of the brake rigging, a reversing shaft, a crank connected with the said abutment block and freely rotatably mounted in relation to the reversing shaft, a further crank connected with the reversing shaft, and a spring interconnecting the said cranks.

2. In a mechanical empty-load switch according to claim 1, the additional feature that the maximum angles of rotation of the two cranks are limited in such a manner as to make the crank connected with the abutment block free to move through so much smaller an angle than the crank connected with the reversing shaft that the straight line interconnecting the centers of the cranks is transmitted to the opposite side of the axis of rotation of the crank connected with the abutment block when shifting the reversing shaft.

3. In a mechanical empty-load switch according to claim 1, the additional feature that the crank connected with the abutment block is rotatably mounted around the reversing shaft, the said two members thus having a common axis of rotation.

4. In a mechanical empty-load switch according to claim 1, the additional feature that the spring interconnecting the cranks is a tensional spring, the said cranks being arranged at opposite sides of the axis of rotation.

5. In a brake device for vehicles, especially railway vehicles, of the type comprising a source of brake power, brake shoes and a brake rigging interconnecting the said source of brake power and the brake shoes for acting upon the wheels of the vehicle, a mechanical empty-load switch comprising in combination an abutment block adapted to form a removable fulcrum for a brake lever of the brake rigging, a crank connected with the abutment block, a reversing shaft around which the said crank is rotatably mounted so that the said crank and reversing shaft have a common axis of rotation, a further crank connected with the reversing shaft, and a spring interconnecting the said cranks, the maximum angles of rotation of the two cranks being limited in such a manner as to make the crank connected with the abutment block free to move through so much smaller an angle than the crank connected with the reversing shaft that the straight line interconnecting the centers of the cranks is transmitted to the opposite side of the axis of rotation of the crank connected with the abutment block when shifting the reversing shaft.

6. In a brake device for vehicles, especially railway vehicles, of the type comprising a source of brake power, brake shoes and a brake rigging interconnecting the said source of brake power and the brake shoes for acting upon the wheels of the vehicle, a mechanical empty-load switch comprising in combination an abutment block adapted to form a removable fulcrum for a brake lever of the brake rigging, a crank connected with the abutment block, a reversing shaft in relation to which the said crank is mounted freely rotatable, a further crank connected with the reversing shaft, the said two cranks being arranged at opposite sides of the axis of rotation, and a tensional spring interconnecting the said cranks, the maximum angles of rotation of the cranks being limited in such a manner as to make the crank connected with the abutment block free to move through so much smaller an angle than the crank connected with the reversing shaft that the straight line interconnecting the centers of the cranks is transmitted to the opposite side of the axis of rotation of the crank connected with the abutment block when shifting the reversing shaft.

7. In a brake device for vehicles, especially railway vehicles, of the type comprising a source of brake power, brake shoes and a brake rigging interconnecting the said source of brake power and the brake shoes for acting upon the wheels of the vehicle, a mechanical empty-load switch comprising in combination an abutment block adapted to form a removable fulcrum to a brake lever of the brake rigging, a crank connected with the abutment block, a reversing shaft around which the said crank is rotatably mounted so as to make the said crank and reversing shaft rotate about a common axis of rotation, a further crank connected with the reversing shaft, and a spring interconnecting the said cranks, the maximum angles of rotation of the said cranks having a relation to each other of about 30°:120° and their end positions being approximately symmetrical in respect of a common straight line through the axis of rotation of the cranks.

8. In a brake device for vehicles, especially railway vehicles, of the type comprising a source of brake power, brake shoes and a brake rigging interconnecting the said source of brake power and the brake shoes for acting upon the wheels of the vehicle, a mechanical empty-load switch comprising in combination a rod pivotally connected with a lever of the brake rigging, an abutment block adapted to form a removable fulcrum for the said rod, a crank connected with the said abutment block, a reversing shaft in relation to which the said crank is mounted freely rotatable, a further crank connected with the reversing shaft, a spring interconnecting the said cranks, abutments for supporting the abutment block in operative position, and a recess formed in the side of said abutment block facing away from the reversing shaft the said recess being shaped and positioned in such a manner as to make its bottom approximately parallel to the direction of movement of the rod when the abutment block is shifted to inoperative position.

9. In a brake device for vehicles, especially railway vehicles, of the type comprising a source of brake power, brake shoes and a brake rigging interconnecting the said source of brake power and the brake shoes for acting upon the wheels of the vehicle, a mechanical empty-load switch comprising in combination a rod pivotally connected with a lever of the brake rigging, an abutment block adapted to form a removable fulcrum to the said rod, a crank connected with the said abutment block, a reversing shaft in relation to which the said crank is mounted freely rotatable, a further crank connected with the reversing shaft, and a spring interconnecting the said cranks, the maximum angles of rotation of the cranks being limited in such a manner as to make the crank connected with the abutment block free to move through so much smaller an angle than the crank connected with the reversing shaft that the straight line interconnecting the centers of the cranks is transmitted to the opposite side of the axis of rotation of the abutment block when shifting the reversing shaft, abutments for supporting the abutment block in operative position, and a recess formed in the side of said abutment block facing away from the reversing shaft the said recess being shaped and positioned in such a manner as to make its bottom approximately parallel to the direction of movement of the rod when the abutment block is shifted to inoperative position.

10. In a brake device for vehicles, especially railway vehicles, of the type comprising a source of brake power, brake shoes and a brake rigging interconnecting the said source of brake power and the brake shoes for acting upon the wheels of the vehicle, a mechanical empty-load switch comprising in combination a rod pivotally connected with a lever of the brake rigging, an abutment block adapted to form a removable fulcrum to the said rod, a crank connected with the said abutment block, a reversing shaft around which the said crank is rotatably mounted so as to make the said crank and reversing shaft rotate about a common axis of rotation, a further crank connected with the reversing shaft, a spring interconnecting the said cranks, abutments for supporting the abutment block in operative position, and a recess formed in the side of said abutment block facing away from the reversing shaft the said recess being shaped and positioned in such a manner as to make its bottom approximately parallel to the direction of movement of the rod when the abutment block is shifted to inoperative position.

11. In a brake device for vehicles, especially railway vehicles, of the type comprising a source of brake power, brake shoes and a brake rigging interconnecting the said source of brake power and the brake shoes for acting upon the wheels of the vehicle, a mechanical empty-load switch comprising in combination a rod pivotally connected with a lever of the brake rigging, an abutment block adapted to form a removable fulcrum to the said rod, a crank connected with the said abutment block, a reversing shaft in relation to which the said crank is mounted freely rotatable, a further crank connected with the reversing shaft the said two cranks being arranged at opposite sides of the axis of rotation, a tensional spring for interconnecting the said cranks, abutments for supporting the abutment block in operative position, and a recess formed in the side of the said abutment block facing away from the reversing shaft the said recess being shaped and positioned in such a manner as to make its bottom approximately parallel to the direction of movement of the rod when the abutment block is shifted to inoperative position.

12. In a brake device for vehicles, especially railway vehicles, of the type comprising a source of brake power, brake shoes and a brake rigging interconnecting the said source of brake power and the brake shoes for acting upon the wheels of the vehicle, a mechanical empty-load switch comprising in combination a rod pivotally connected with a lever of the brake rigging, an abutment block adapted to form a removable fulcrum to the said rod, a crank connected with the said abutment block, a reversing shaft around which the said crank is rotatably mounted so as to make the said crank and reversing shaft rotate about a common axis of rotation, a further crank connected with the reversing shaft the said two cranks being arranged at opposite sides of the axis of rotation, a tensional spring for interconnecting the said cranks, the maximum angles of rotation of the said cranks having a relation to each other of about 30°: 120° and their end positions being approximately symmetrical in respect of a common straight line through the axis of rotation of the cranks, abutments for supporting the abutment block in operative position, and a recess formed in the side of the said abutment block facing away from the reversing shaft the said recess being shaped and positioned in such a manner as to make its bottom approximately parallel to the direction of movement of the rod when the abutment block is shifted to inoperative position.

BERT HENRY BROWALL.